United States Patent
Chen et al.

(10) Patent No.: US 7,493,485 B2
(45) Date of Patent: Feb. 17, 2009

(54) STRUCTURE OF EMBEDDED MEMORY UNIT WITH LOADER AND SYSTEM STRUCTURE AND OPERATION METHOD FOR THE EMBEDDED MEMORY APPARATUS

(75) Inventors: Yung-Lung Chen, Taipei (TW); Chia-Jung Yang, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 531 days.

(21) Appl. No.: 11/160,823

(22) Filed: Jul. 12, 2005

(65) Prior Publication Data

US 2006/0253695 A1 Nov. 9, 2006

(30) Foreign Application Priority Data

May 3, 2005 (TW) ............... 94114196 A

(51) Int. Cl.
*G06F 15/177* (2006.01)
*G06F 9/445* (2006.01)
*G06F 9/24* (2006.01)
(52) U.S. Cl. ............ 713/2; 714/5; 713/1; 713/100
(58) Field of Classification Search .......... 713/1, 713/2, 100
See application file for complete search history.

(56) References Cited

U.S. PATENT DOCUMENTS

| 5,991,860 | A * | 11/1999 | Gross et al. ............... 711/173 |
| 6,425,079 | B1 * | 7/2002 | Mahmoud ................. 713/2 |
| 6,567,911 | B1 * | 5/2003 | Mahmoud ................. 713/2 |
| 7,028,174 | B1 * | 4/2006 | Atai-Azimi et al. ........ 713/1 |
| 7,188,278 | B1 * | 3/2007 | Diaz et al. ............... 714/36 |
| 7,234,047 | B1 * | 6/2007 | Mahmoud ................. 713/1 |
| 2003/0051114 | A1 * | 3/2003 | Natu ...................... 711/165 |
| 2004/0205399 | A1 * | 10/2004 | Wang et al. ............... 714/25 |
| 2006/0129795 | A1 * | 6/2006 | Bulusu et al. .............. 713/2 |

* cited by examiner

*Primary Examiner*—Thomas Lee
*Assistant Examiner*—Fahmida Rahman
(74) *Attorney, Agent, or Firm*—Jianq Chyun IP Office

(57) ABSTRACT

A structure of embedded memory unit with loader comprises a main memory area and an information area as a part of the main memory area. A plurality of loader-program parts is dispersedly stored in different addresses of the main memory area, wherein the loader-program parts are combined to form a complete loader. A loader mapping area is used to store the loader-program during the boot stage. When the boot sequence starts, the original information stored in the loader mapping area is temporarily backup to a temporary space; and the released space is used to store the loader-program. After the boot sequence is completed, the original information is moved back to the original location.

11 Claims, 3 Drawing Sheets

STRUCTURE OF EMBEDDED MEMORY UNIT WITH LOADER AND SYSTEM STRUCTURE AND OPERATION METHOD FOR THE EMBEDDED MEMORY APPARATUS

CROSS-REFERENCE TO RELATED APPLICATION

This application claims the priority benefit of Taiwan application serial no. 94114196, filed on May 3, 2005. All disclosure of the Taiwan application is incorporated herein by reference.

BACKGROUND OF THE INVENTION

1. Field of the Invention

The present invention relates to an embedded memory apparatus, and more particularly, to a structure of embedded memory unit, and a system structure and operation method for the embedded memory apparatus.

2. Description of the Related Art

In recent years, due to the massive researches and development on the application of digital products, especially for the mobility of digital products, memory apparatuses have become indispensable in digital products for storing information. Accordingly, the memory apparatus must be designed to be thinner and lighter to meet the requirement of the compact size of a portable digital apparatus.

FIG. 1 schematically shows a block diagram of the system structure for a conventional embedded memory apparatus. Referring to FIG. 1, an embedded memory apparatus 100 is connected to an external digital apparatus 102, for example a personal computer (PC), via an I2C (inter-integrated circuit) USB bus interface. The embedded memory apparatus 100 comprises a serial interface 104, an ROM (read only memory) 106, a buffer unit 112 for storing a program, an application circuit 114, a micro controller unit (MCU) 108, a memory main area 110 and an information area 110a built in the memory main area 110.

After the memory apparatus 110 is initialized by the external digital apparatus 102, first, an input data is input to the serial interface 104, which converts the input data into an instruction signal. Then, the data path is divided into two different paths. In the first path, the instruction signal is directly input into the MCU 108; in the second path, the instruction signal is input into the buffer unit 112 in which a program has been stored. Then, the MCU 108 generates and provides an operation result to the application circuit 114 by running a loader-program obtained from the ROM 106 with the input data and the data to be modified. In the meantime, the program data stored in the buffer unit 112 and the loader-program provided by the application circuit 114 are both applied to burn the modified data into the addresses corresponding to the memory main area 110 in the memory apparatus 100, such that a main program for operating the memory apparatus 100 is modified and the boot sequence is totally completed.

Here, in the structure of the conventional memory apparatus 100, the loader is separately stored in an ROM 106. In the prior art, the boot sequence must write the loader into the embedded ROM, and then moves the program stored in the memory or in the buffer to a program memory area specified by the loader. Since the address decoder is required by the ROM 106 to obtain the address of the data, the size of the ROM 106 is inevitably increased due to the requirement of the address decoder. Therefore, the size of the ROM 106 is increased. In addition, the size of the decoder is greater than the size of the memory unit. Furthermore, when the bit number of the address is getting bigger, the size of the decoder is obviously increased. Accordingly, in the conventional apparatus 100 which requires a separate ROM 106 to store the loader, the large size of the ROM 106 causes a high manufacturing cost.

SUMMARY OF THE INVENTION

Therefore, it is an object of the present invention to provide a memory apparatus in which a separate memory unit is not required for storing the program data of the loader. Here, the memory apparatus is for example a flash memory apparatus.

In accordance with the design of the memory apparatus provided by the present invention, the program data of the loader is divided into a plurality of data parts, and the data parts are dispersedly stored in a plurality of small areas in the memory apparatus. When the program data of the loader is called, the data parts are combined to form a complete program data of the loader.

The present invention provides a structure of an embedded memory unit. The structure comprises an information area, a main memory area, and a plurality of programs dispersedly stored in different addresses of the main memory area. Wherein, the programs are combined to form a loader-program later. The structure further comprises a dynamic loader mapping area for temporarily storing the loader-program during the boot stage. When the boot sequence is initialized, the original information in the loader mapping area is temporarily backup to a temporary space, and the released space is used to store the loader-program. After the boot sequence is completed, the original information is moved back to the original location.

A system structure for an embedded memory apparatus provided by the present invention comprises an embedded memory unit, a serial interface, a buffer, an application circuit, and a micro controller unit (MCU). Wherein, a main program and a loader are both stored in the embedded memory unit, and the loader is divided into a plurality of parts dispersedly stored in the main program. The serial interface is configured to receive an input data. The buffer is electrically coupled to the serial interface for storing a program code of the input data. The MCU electrically coupled to both the serial interface and the embedded memory unit provides a data to the application circuit by running the loader obtained from the embedded memory unit on the output of the serial interface. In addition, the application circuit is cooperated with the buffer in order to access the embedded memory unit. Furthermore, the main program can be modified when required.

The present invention further provides an operation method for an embedded memory apparatus. The operation method comprises the following steps. First, a memory unit is provided, wherein a loader-program is stored in the memory unit, and the loader-program is divided into a plurality of program parts dispersedly stored in a main program of the memory unit. Then, a loader mapping area is selected from the memory unit, and an original information stored in the loader mapping area is backup to a temporally memory space. Afterwards, the program parts are combined in the loader mapping area to form a complete loader-program. Then, an MCU performs and completes the boot sequence by running the loader-program with the contents of the main program.

Meanwhile, if it is required to update the main program, the main program will be modified at the same time. Finally, the backup original information is moved back to the loader mapping area.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

In order to minimize the size of the embedded memory apparatus, the present invention discloses an idea of storing the loader-program without using the conventional ROM 106. Instead, in the present invention, the loader-program is divided into a plurality of program parts dispersedly stored in a main program of the memory apparatus. When the memory apparatus is initialized, the program parts are combined in a loader mapping area of the memory apparatus to from a complete loader-program. An embodiment is exemplified hereinafter for describing the characteristics of the present invention. However, the present invention is not limited by the embodiment described below.

Figure 1:
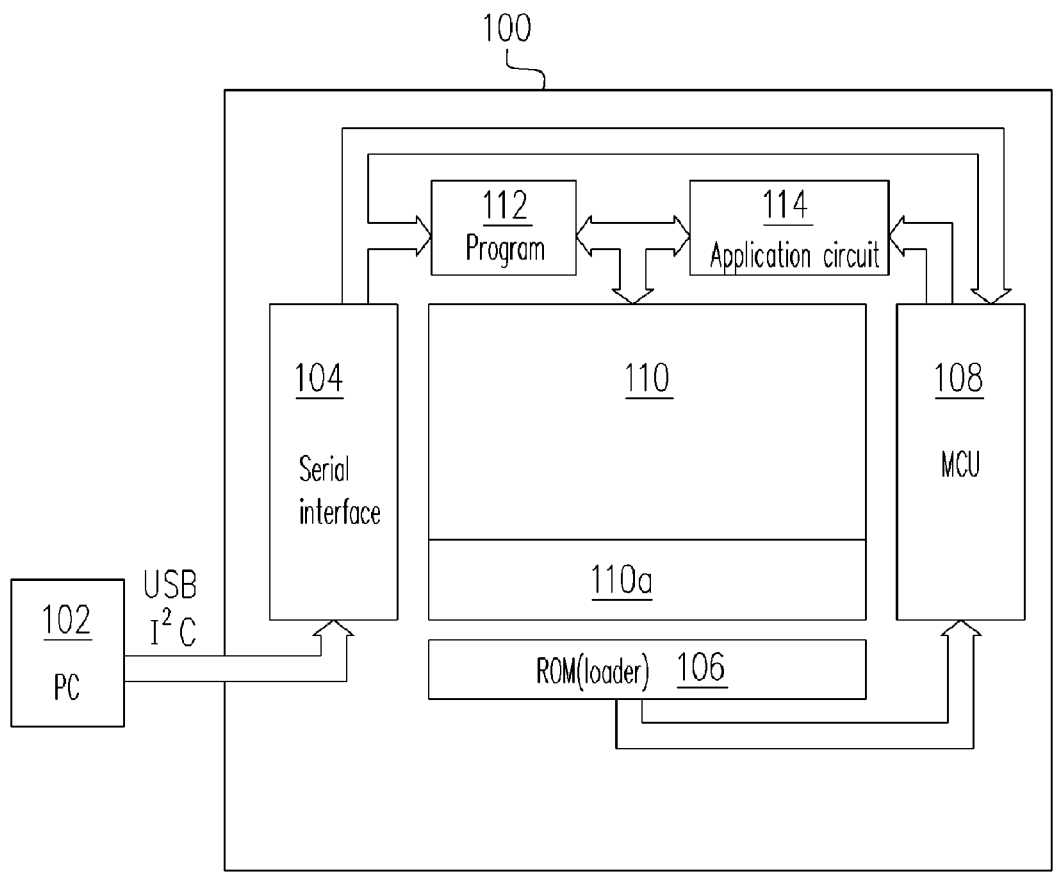
FIG. 1 schematically shows a block diagram of the system structure for a conventional embedded memory apparatus.
Figure 2:
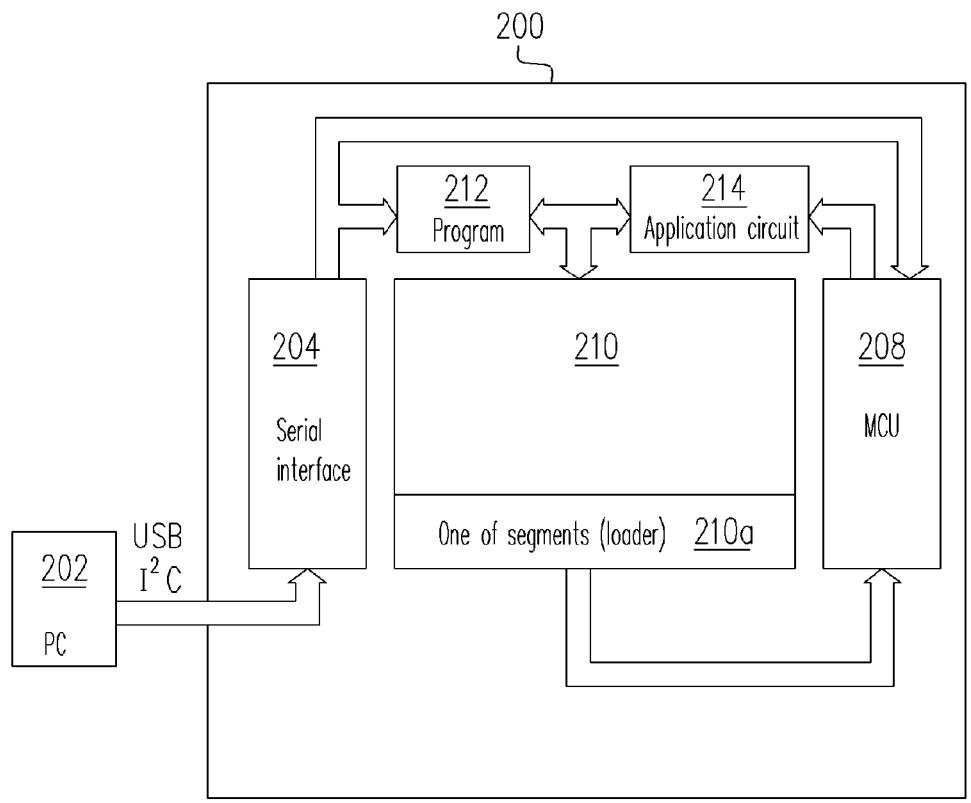
FIG. 2 schematically shows a block diagram of the system structure for an embedded memory apparatus according to an embodiment of the present invention.
Figure 3:
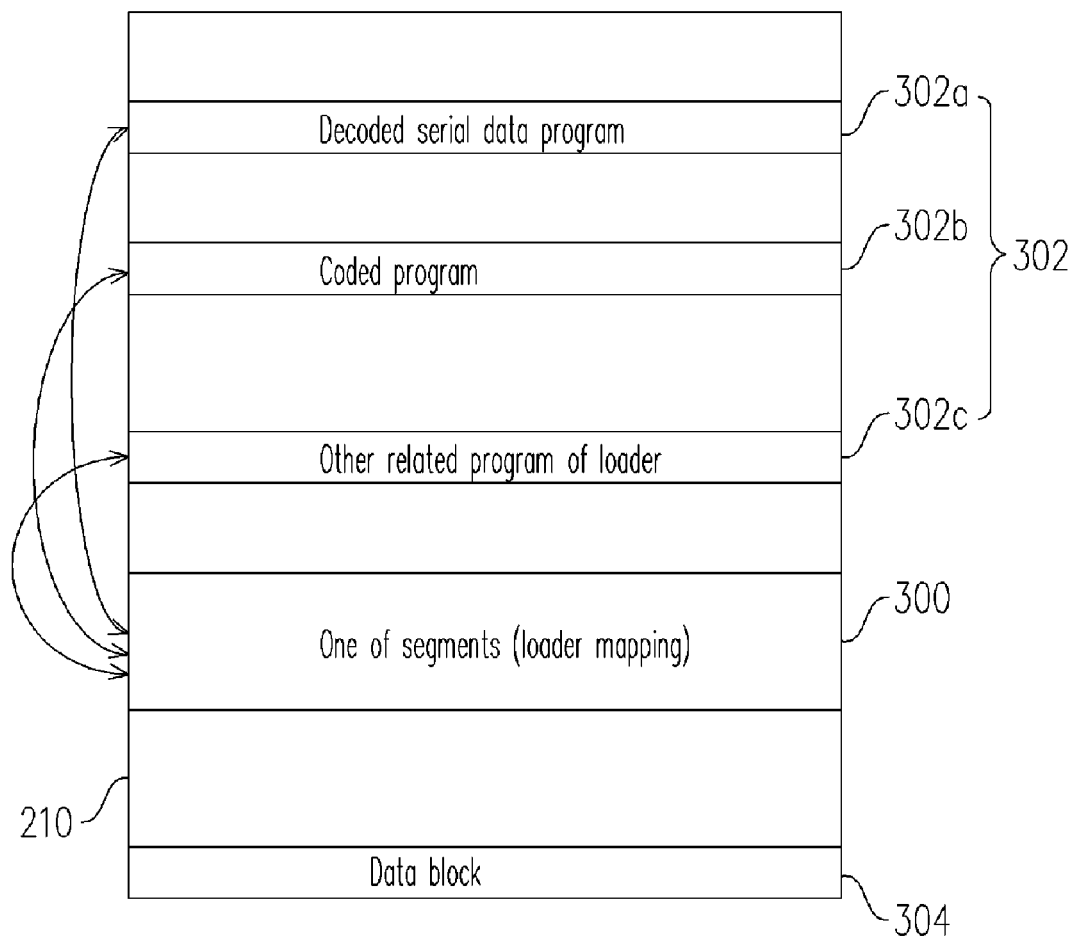
FIG. 3 schematically shows a structure diagram of a memory unit in the embedded memory apparatus according to an embodiment of the present invention.

FIG. 2 schematically shows a block diagram of the system structure for an embedded memory apparatus according to an embodiment of the present invention. FIG. 3 schematically shows a structure diagram of a memory unit in the embedded memory apparatus according to an embodiment of the present invention. Referring to FIG. 3, the structure of the memory unit provided by the present invention comprises a main memory area 210, an information area 304, a plurality of loader-program parts 302a, 302b, 302c that are combined to form a loader-program 302, and a loader mapping area 300. Wherein, the loader mapping area 300 is a temporary area for temporarily storing the loader-program during the boot stage. The structure and operation of the memory unit are described in detail later.

Referring to FIG. 2, first, the memory apparatus illustrated in FIG. 3 comprises a serial interface 204 receiving an input signal from an external digital apparatus, for example, a personal computer (PC) 202 via an 12C (inter-integrated circuit) USB bus interface. After the external input signal is received by the serial interface 204, a boot sequence is started to convert the input signal into an instruction signal. Then, the data path is divided into two different paths. In the first path, the instruction signal is directly input into the MCU 208; in the second path, the instruction signal is input into the buffer unit 212 in which a program has been stored. Then, the MCU 208 generates and provides an operation result to the application circuit 214 by running a loader-program 210a obtained from the memory unit with the input data and the data to be modified. Afterwards, the program data stored in the buffer unit 212 and the loader-program 210a provided by the application circuit 114 are both applied to burn the modified data into the addresses corresponding to the memory main area 210 in the memory apparatus 200, such that a main program for operating the memory apparatus 200 is modified and the boot sequence is completed.

Referring to FIG. 3, for physical operation, when the boot sequence is initialized or when the main program is to be modified, a first instruction is input via the serial interface 204 to execute a preinstalled main program, which temporarily backs up the original information stored in the loader mapping area 300 to a temporary memory space (not shown). Here, the loader mapping area 300 may be either a specific area in the memory main area 210 or a randomly selected area. However, it should not be an area containing the loader-program. Then, a second instruction is generated for moving the loader parts 302a, 302b, 303c to the loader mapping area 300 in which a complete loader-program is formed by combining the program parts. Wherein, the loader may be a serial data decoder, a program timing controller, a data shift controller or other parts. Furthermore, the loader parts are not limited to using the divided units as mentioned above. In fact, the loader parts may be appropriately divided, for example, it is not limited to be a complete serial data decoder. In general, the loader parts are intricately burned into the main program in advance when the memory is fabricated.

Then, another instruction is generated to instruct the MCU 208 to delete the data stored in the area where the program to be modified is stored. Then, a loader process is executed to notify the internal application circuit 214 to issue a control signal to control the program. Finally, the boot sequence or the operation of modifying the main program is completed. Meanwhile, the original information temporarily stored in the register is moved back to the loader mapping area 300 and recovered to its original state. However, if the original data stored in the loader mapping area 300 is empty, the loader information stored in the loader mapping area 300 can be directly deleted. Alternatively, the loader information of the loader mapping area 300 may be temporarily reserved and emptied later when required. Moreover, the register may be other registers rather than the memory unit 210; and the memory unit 210 generally includes an information area. Furthermore, the main program and the information area mentioned above are the basic components of the memory apparatus, which should be familiar to one of the ordinary skill in the art, thus its details are omitted herein.

The system operation method for the memory apparatus provided by the present invention comprises the following steps. First, a memory unit 210 is provided, wherein a loader-program 302 is stored in the memory unit 210, and the loader-program 302 is divided into a plurality of program parts 302a, 302b, 302c dispersedly stored in a main program of the memory unit 210. Then, a loader mapping area 210a is selected from the memory unit, and an original information stored in the loader mapping area 210a is backup to a temporally memory space. Afterwards, the program parts 302a, 302b, 302c are combined in the loader mapping area 210a to form a complete loader-program. Then, the MCU 208 performs and completes a boot sequence by running the loader-program with the contents of the main program. Meanwhile, if it is required to update the main program, the main program is modified. Finally, the backup original information is moved back to the loader mapping area.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A structure of an embedded memory unit with a loader program, the structure comprising:
   a main memory area;
   an information area contained in the main memory area;
   a plurality of loader-program parts dispersedly stored in different addresses of the main memory area, wherein the loader-program parts are combined to form the loader-program; and
   a loader mapping area working as a temporary area in the main memory area for temporarily storing the loader-program at a boot stage,
   wherein during the boot stage, an original information stored in the loader mapping area is temporarily backup to a temporary space, and a released space is used to store the loader-program; when the boot stage is completed, the original information is moved back to the loader mapping area.

2. The structure of the embedded memory unit with the loader-program of claim 1, wherein the loader-program parts are pre-burned in a main program of the main memory area.

3. The structure of the embedded memory unit with the loader-program of claim 1, wherein the loader-program parts comprise at least one of a serial data decoder, a program timing controller, and a data shift controller.

4. A system structure of an embedded memory apparatus, comprising:
   an embedded memory unit in which a main program and a loader program being stored, wherein the loader program is divided into a plurality parts dispersedly stored in the main program, and the embedded memory unit comprises:
   a main memory area;
   an information area contained in the main memory area;
   the plurality of loader-program parts dispersedly stored in different addresses of the main memory area, wherein the loader-program parts are combined to form the loader-program; and
   a loader mapping area working as a temporary area in the main memory area for temporarily storing the loader-program at a boot stage;
   a serial interface for receiving an input data;
   a buffer electrically coupled to the serial interface for storing a program code;
   an application circuit; and
   a micro controller unit (MCU) electrically coupled to both the serial interface and the embedded memory unit for providing a data to the application circuit by running the loader program obtained from the embedded memory unit with an output of the serial interface, wherein, the application circuit is cooperated with the buffer to access the embedded memory unit and to modify the main program when required,
   wherein during the boot stage, an original information stored in the loader mapping area is temporarily backup to a temporary space, and a released space is used to store the loader -program; when the boot stage is completed, the original information is moved back to the loader mapping area.

5. The system structure of the embedded memory apparatus of claim 4, wherein the loader-program parts are pre-burned in the main program of the main memory area.

6. The system structure of the embedded memory apparatus of claim 4, wherein the loader-program parts comprise at least one of a serial data decoder, a program timing controller, and a data shift controller.

7. A system operation method for an embedded memory apparatus, comprising:
   providing a memory unit in which a loader-program being stored, wherein the loader-program is divided into a plurality of program parts dispersedly stored in a main program of the memory unit;
   selecting a loader mapping area from the memory unit;
   backing up an original information stored in the loader mapping area to a temporary memory space;
   using the loader mapping area to combine the program parts into a complete loader-program;
   using a micro controller unit (MCU) to execute the loader-program with the contents of the main program so as to complete a boot sequence;
   wherein, if the main program needs to be modified, the main program is modified; and
   moving the original information back to the loader mapping area.

8. The system operation method for the embedded memory apparatus of claim 7, wherein the selected loader mapping area is located in a specific area rather than the area storing the program parts.

9. The system operation method for the embedded memory apparatus of claim 7, wherein the selected loader mapping area is located in a randomly selected area rather than the area storing the program parts.

10. The system operation method for the embedded memory apparatus of claim 7, wherein the loader-program parts comprise at least one of a serial data decoder, a program timing controller, and a data shift controller.

11. The system operation method for the embedded memory apparatus of claim 7, wherein the program parts of the loader-program are pre-burned in the memory unit.

* * * * *